(12) United States Patent
Li et al.

(10) Patent No.: US 11,820,661 B2
(45) Date of Patent: Nov. 21, 2023

(54) DEVICE AND METHOD FOR SINGLE-STAGE CONTINUOUS PREPARATION OF CARBON NANOTUBES

(71) Applicant: Shandong Dazhan Nano Materials Co., Ltd., Binzhou (CN)

(72) Inventors: Yan Li, Binzhou (CN); Lei Geng, Binzhou (CN); Zhenhua Lv, Binzhou (CN); Longli Li, Binzhou (CN); Zhongcun Bao, Binzhou (CN)

(73) Assignee: Shandong Dazhan Nano Materials Co., Ltd.

( * ) Notice: Subject to any disclaimer, the term of this patent is extended or adjusted under 35 U.S.C. 154(b) by 841 days.

(21) Appl. No.: 16/605,834

(22) PCT Filed: Mar. 27, 2018

(86) PCT No.: PCT/CN2018/080597
§ 371 (c)(1),
(2) Date: Feb. 1, 2021

(87) PCT Pub. No.: WO2018/192345
PCT Pub. Date: Oct. 25, 2018

(65) Prior Publication Data
US 2021/0395090 A1 Dec. 23, 2021

(30) Foreign Application Priority Data
Apr. 21, 2017 (CN) .......................... 201710265954.9

(51) Int. Cl.
*C01B 32/164* (2017.01)
*B01J 8/00* (2006.01)
(Continued)

(52) U.S. Cl.
CPC ............. *C01B 32/164* (2017.08); *B01J 8/005* (2013.01); *B01J 8/1881* (2013.01); *B01J 8/40* (2013.01);
(Continued)

(58) Field of Classification Search
CPC ... C01B 32/164; C01B 2202/06; C01B 32/05; B01J 8/005; B01J 8/1881; B01J 8/40;
(Continued)

(56) References Cited

U.S. PATENT DOCUMENTS

| 4,202,752 A | 5/1980 | Sherwood et al. |
| 2007/0154382 A1* | 7/2007 | Edwin .................. D01F 9/1278 422/139 |

(Continued)

FOREIGN PATENT DOCUMENTS

| CN | 2093031 | * 1/1992 | ................ B01J 8/24 |
| CN | 2093031 U | 1/1992 | |

(Continued)

OTHER PUBLICATIONS

Danafar, et al., Fluidized bed catalytic chemical vapor deposition synthesis of carbon nanotubes—A review, Chemical Engineering Journal 2009; 155: 37-48 (Year: 2009).*

(Continued)

*Primary Examiner* — Daniel C. McCracken
(74) *Attorney, Agent, or Firm* — Christopher & Weisberg, P.A.

(57) ABSTRACT

An apparatus for continuous preparation of carbon nanotubes, based on a fluidized bed reactor. The fluidized bed reactor comprises an annular varying diameter zone, a raw material gas inlet, a catalyst feeding port, a protective gas inlet, and a pulse gas controller. The annular varying diameter zone is located at a zone from a ¼ position starting from the bottom to the top. The pulse gas controller is disposed at (Continued)

the arc-shaped top portion of the annular varying diameter zone. The catalyst feeding port is located at the top of the fluidized bed reactor. The raw material gas inlet and the protective gas inlet are located at the bottom of the fluidized bed reactor. The device is also provided with a product outlet and a tail gas outlet. The device has a simple structure and low cost, is easy to operate, has a high raw material utilization rate, can effectively control the problem of carbon deposition on the inner wall of a primary reactor, can manufacture high-purity carbon nanotubes, and is suitable for large-scale industrial production.

10 Claims, 4 Drawing Sheets

(51) Int. Cl.
*B01J 8/18* (2006.01)
*B01J 8/40* (2006.01)
*B01J 23/745* (2006.01)
*B01J 23/75* (2006.01)
*B01J 23/755* (2006.01)

(52) U.S. Cl.
CPC ............ *B01J 23/745* (2013.01); *B01J 23/75* (2013.01); *B01J 23/755* (2013.01); *B01J 2208/00548* (2013.01); *C01B 2202/06* (2013.01); *C01P 2004/03* (2013.01); *C01P 2006/12* (2013.01); *C01P 2006/80* (2013.01)

(58) Field of Classification Search
CPC ........ B01J 23/745; B01J 23/75; B01J 23/755; B01J 2208/00548; B01J 8/1809; B01J 2219/185; B01J 2219/1946; B01J 8/12; B01J 8/18; C01P 2004/03; C01P 2006/12; C01P 2006/80; C01P 2004/13; C01P 2004/04; C01P 2004/51; C01P 2004/64; D01F 9/00

See application file for complete search history.

(56) References Cited

U.S. PATENT DOCUMENTS

| | | | |
|---|---|---|---|
| 2014/0203916 A1 | 7/2014 | Sano et al. | |
| 2015/0246813 A1 | 9/2015 | Koveal, Jr. et al. | |

FOREIGN PATENT DOCUMENTS

| | | | | |
|---|---|---|---|---|
| CN | 1125409 | A | 6/1996 | |
| CN | 1208432 | * | 2/1999 | ............... B01J 8/12 |
| CN | 1208432 | A | 2/1999 | |
| CN | 1854660 | A | 11/2006 | |
| CN | 1906337 | A | 1/2007 | |
| CN | 103395774 | A | 11/2013 | |
| CN | 103446877 | A | 12/2013 | |
| CN | 103502146 | A | 1/2014 | |
| CN | 104555989 | A | 4/2015 | |
| CN | 104762108 | A | 7/2015 | |
| CN | 105271164 | A | 1/2016 | |
| EP | 3170790 | A1 | 5/2017 | |
| JP | H01284329 | A | 11/1989 | |
| KR | 1020150056535 | B1 | 5/2015 | |
| WO | 9500261 | | 1/1995 | |

OTHER PUBLICATIONS

Dasgupta, et al., Fluidized bed synthesis of carbon nanotubes—A review, Chemical Engineering Journal 2011; 171: 841-869 (Year: 2011).*
See, et al., A Review of Carbon Nanotube Synthesis via Fluidized-Bed Chemical Vapor Deposition, Ind. Eng. Chem. Res. 2007; 46: 997-1012 (Year: 2007).*
Chinese Office Action dated Apr. 14, 2020, for corresponding Chinese Application No. 201710265954.9, consisting of 17-pages.
International Search Report and Written Opinion dated Jun. 29, 2018, for corresponding International Application No. PCT/CN2018/080597 filed on Mar. 27, 2018; consisting of 10-pages.
Korean Intellectual Property Office, Request for the Submission of an Opinion, dated Oct. 24, 2022 for corresponding Application No. KR10-2019-7033003, 6 pages.

* cited by examiner

DEVICE AND METHOD FOR SINGLE-STAGE CONTINUOUS PREPARATION OF CARBON NANOTUBES

CROSS-REFERENCE TO RELATED APPLICATIONS:

This application is a Submission under 35 U.S.C. § 371 for U.S. National Stage Patent Application of, and claims priority to, International Application Number PCT/CN2018/080597 entitled DEVICE AND METHOD FOR SINGLE-STAGE CONTINUOUS PREPARATION OF CARBON NANOTUBES, filed Mar. 27, 2018, which is related to and claims priority to Chinese Patent Number 201710265954.9, filed Apr. 21, 2017 the entirety of all of which are incorporated herein by reference.

TECHNICAL FIELD

The present disclosure relates to an apparatus and a method for single-stage continuous preparation of carbon nanotubes. The apparatus for continuous preparation of carbon nanotubes according to the present disclosure utilizes a single-stage fluidized bed. The apparatus is simple in structure and easy to operate, allows continuous, steady production of carbon nanotubes at ambient or high pressure, performs well in promoting the utilization of catalysts and raw materials and enhancing the purity of carbon nanotube products, saves cost and envisions massive industrial production.

BACKGROUND ART

As a one-dimensional nanomaterial, a carbon nanotube possesses excellent physical and mechanical properties, and is mainly consisting of several to tens of layers of co-axial cylindrical tubes made of carbon atoms arranged hexagonally. It has a very large aspect ratio, wherein its diameter is usually between 1 nm and 100 nm, and its length is a few microns to hundreds of microns. Just because of its large aspect ratio, a carbon nanotube performs very well in terms of mechanics, electricity, and electrical and thermal conductivity. Due to its excellent performances, a carbon nanotube is promising in broad potential applications in many fields such as catalyst carriers, rubber-plastic composite materials, electrochemical materials, and photoelectric sensors.

Large-scale continuous production of carbon nanotubes has always been a bottleneck that plagues the application of carbon nanotube technology. For a long time, the carbon source required for preparation of carbon nanotubes is mainly low-carbon olefins, alkanes and alcohols. These low-carbon materials are advantageous for cracking, but have high cost. Use of large molecular weight carbon sources such as toluene, cyclohexane and the like may also be made. However, the preparation process is complex, and the purity of the resulting carbon nanotubes is very low.

Nowadays, a fluidized bed reactor is typically used in an apparatus for preparation of carbon nanotubes, wherein a carbon source is cracked to form carbon nanotubes in the presence of a catalyst. A fixed fluidized bed process apparatus is simple, and flexible in operation, but it's only suitable for catalyst screening and preparation of a small amount of carbon nanotubes. A bubbling fluidized bed can process a large amount of catalyst, and the carbon nanotube output is also good, but the conversion rate of the raw material gas is low and the cost is high. A floating fluidized bed is suitable for a catalytic system that is easy to be gasified and decomposed, but with many limitations. A mobile fluidized bed has problems related with temperature gradient and moving speed. In addition, for a conventional fluidized bed, the density and particle size of a catalyst have a significant influence on reaction efficiency. If the density of the catalyst is low, the prepared carbon nanotubes have such a small density that they can be easily blown out of the reactor, and the residence time is short, resulting in low catalyst utilization. Conversely, if the residence time in the reactor is increased, the carbon nanotubes tend to agglomerate and block the reactor, readily causing, inter alia, difficulty in fluidization during the production.

Therefore, there is still a need in the art to develop an apparatus capable of continuously and efficiently producing carbon nanotubes, which apparatus is advantageous in terms of simple structure, easy operation, low cost, and ability to maximize catalyst and raw material utilization and effectively control carbon deposition on an inner wall of a primary reactor. When this apparatus is used to prepare carbon nanotubes continuously, the heat and mass transfer is uniform and stable during the reaction, and the resulting carbon nanotubes have high purity. The product thus obtained has consistent quality, suitable to be produced industrially on a large scale.

SUMMARY

The present disclosure is aimed to provide an apparatus and a method for continuous production of carbon nanotubes, wherein the apparatus has the advantages of simple structure, low cost, easy operation, and high utilization of raw materials. It is capable of effectively alleviating the problem of carbon deposition on an inner wall of a primary reactor, and producing high purity carbon nanotubes, suitable for industrial production on a large scale.

Therefore, in one aspect of the present disclosure, there is provided an apparatus for continuous preparation of carbon nanotubes, wherein the apparatus comprises: (a) a fluidized bed reactor having an annular varying diameter zone, a raw material gas inlet, a catalyst feed port, a protective gas inlet, and a pulse gas controller, wherein the annular varying diameter zone is located between a position that is ¼ of the fluidized bed reactor from the bottom and the top of the fluidized bed reactor; the pulse gas controller is disposed at a circular arc-shaped top of a varying diameter portion in the annular varying diameter zone; the catalyst feed port is located at the top of the fluidized bed reactor; and the raw material gas inlet and the protective gas inlet are located at the bottom of the fluidized bed reactor, wherein the apparatus is also provided with a product outlet and a tail gas outlet.

In a preferred embodiment of the present disclosure, the apparatus further comprises a separation zone in fluid communication with the fluidized bed reactor, a return pipe and a feedback device disposed on the return pipe, wherein a material recycle port is provided at the bottom of the separation zone; one end of the return pipe is fluidly coupled to the material recycle port in the separation zone, and the other end is fluidly coupled to the bottom of the fluid reactor.

In a preferred embodiment of the present disclosure, the number of the annular varying diameter portions in the annular varying diameter zone is 3-5, and the annular varying diameter zone is located from ¼ to ½ of the fluidized bed reactor from the bottom, wherein the varying diameter portion has a horizontal length of ⅛ to ⅕ of a diameter of the primary reactor, and the varying diameter portion has a curvature of 10°-30°.

In a preferred embodiment of the present disclosure, the apparatus further comprises a dense phase material transport device disposed at the product outlet, wherein the dense phase material transport device is preferably a high temperature blower or a Coanda effect based air amplifier.

In a preferred embodiment of the present disclosure, the apparatus further comprises a Coanda effect based gas curtain disposed at the bottom of the fluidized bed reactor.

In a preferred embodiment of the present disclosure, the apparatus further comprises a metering feed device and a feed gas lock device disposed at the catalyst feed port, and a discharge gas lock device disposed at the product outlet.

In a preferred embodiment of the present disclosure, the raw material gas inlet and/or the protective gas inlet are arranged at a plurality of levels and/or at a plurality of points at the same level in the fluidized bed reactor.

In a preferred embodiment of the present disclosure, the protective gas inlet and the raw material gas inlet are arranged separately or combined for feeding.

In another aspect of the present disclosure, there is provided a method for continuous preparation of carbon nanotubes using the apparatus of the present disclosure, comprising:

1) providing a carbon source and a catalyst in a fluidized state to a fluidized bed reactor, wherein the carbon source is cracked into carbon nanotubes under the action of the catalyst at a temperature of 500-1050° C.;

2) using a pulse gas controller to apply a pulse gas to an annular varying diameter zone, wherein, along with variation of the gas in flow rate and direction at an annular varying diameter portion, carbon nanotubes having a catalyst content of greater than X are blown to an upper portion of the fluidized bed reactor to continue the cracking reaction, wherein X is any value in the range of 1.5%-3%, wherein the catalyst content is based on a weight of the carbon nanotubes that are formed;

3) optionally, using a feedback device on a return pipe to deliver carbon nanotubes having a catalyst content of greater than X in a separation zone back to the primary reactor to continue the cracking reaction to form carbon nanotubes.

In a preferred embodiment of the present disclosure, a carrier gas entering through the protective gas inlet has a flow rate of 0.5-300 m/s, preferably 5.0-200 m/s, more preferably 10-100 m/s; a gas entering through the raw material gas inlet of the fluidized bed reactor has a flow rate of 0.2-300 m/s, preferably 1.0-200 m/s, more preferably 10-100 m/s; a gas flow rate within the fluidized bed is 0.01-10 m/s, preferably 0.05-5 m/s, more preferably 0.1-3 m/s; a mixed gas entering through the gas inlet has a gas flow rate of 0.1 m/s-2 m/s, preferably 0.3 m/s-1 m/s; and a pressure in the fluidized bed reactor is from atmospheric pressure to 4 MPa.

DESCRIPTION OF THE DRAWINGS

The invention will be illustrated with reference to the following drawings, in which.

DETAILED DESCRIPTION

Figure 1:
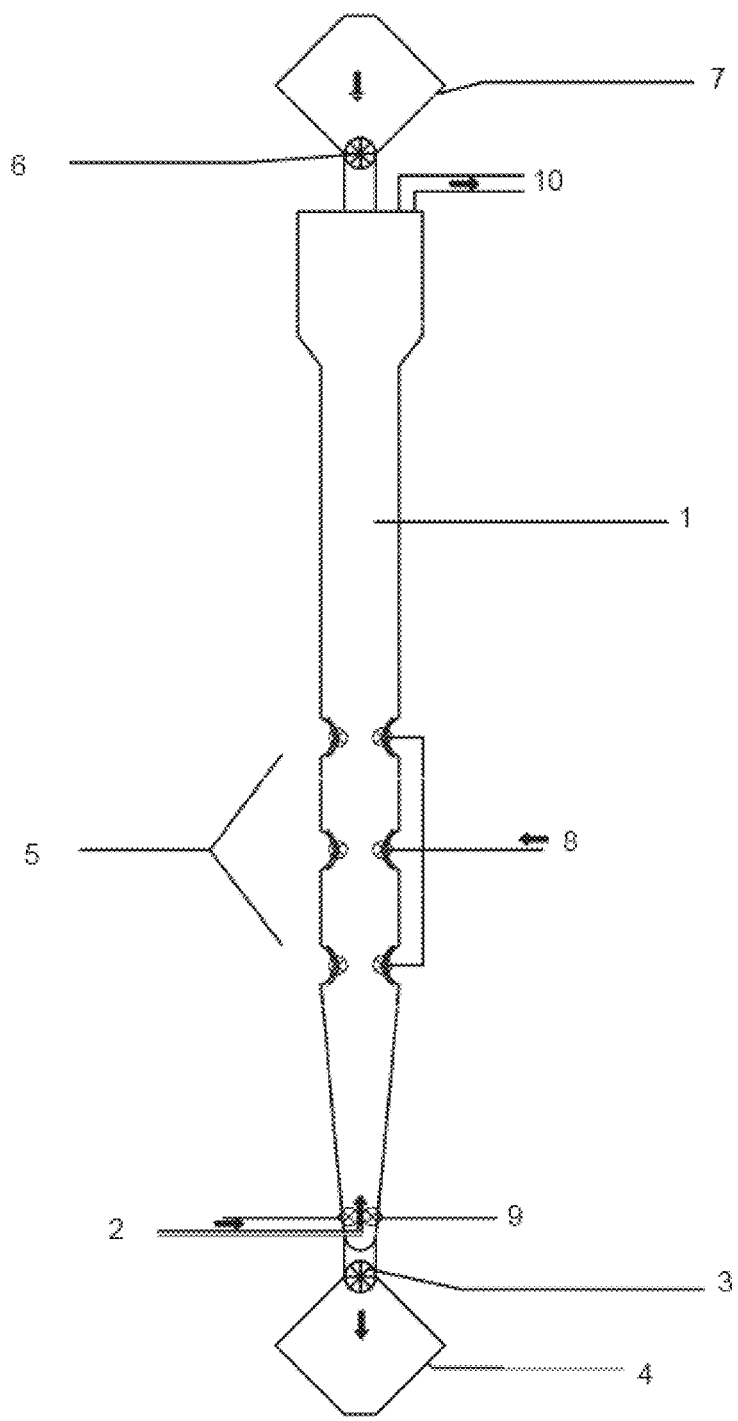
FIG. 1 is a schematic view showing a reaction apparatus for single-stage continuous preparation of carbon nanotubes according to the present disclosure.

The present disclosure provides an apparatus for continuous preparation of carbon nanotubes, wherein the apparatus comprises: a fluidized bed reactor having an annular varying diameter zone, a raw material gas inlet, a catalyst feed port, a protective gas inlet, and a pulse gas controller, wherein the annular varying diameter zone is located between a position that is ¼ of the fluidized bed reactor from the bottom and the top of the fluidized bed reactor, the pulse gas controller is disposed at a circular arc-shaped top of a varying diameter portion in the annular varying diameter zone; the catalyst feed port is located at the top of the fluidized bed reactor; and the raw material gas inlet and the protective gas inlet are located at the bottom of the fluidized bed reactor, wherein the apparatus is also provided with a product outlet and a tail gas outlet.

The inventors have found that providing a pulse gas stream at the top of an annular varying diameter portion of the annular varying diameter zone can produce a Coanda effect which changes the flow rate and flow direction of the gas, generates a "tumbling" effect and sieves the carbon nanotube particles, wherein the completely reacted carbon nanotube particles settle down to the bottom of the reactor under gravity, whereas the incompletely reacted particles having a higher ash content are blown to the upper portion of the reactor by the gas stream to be further fluidized and go on with the cracking reaction, thereby improving the utilization of the carbon source and the purity of the carbon nanotubes. At the same time, the pulse gas stream also serves to aid in fluidization and to clean up the material adhering to the wall.

The specific parts of the apparatus for continuous preparation of carbon nanotubes according to the present disclosure will be described as follows.

(1) Fluidized Bed Reactor

In the present disclosure, the fluidized bed reactor refers to a fluidized bed reactor for preparation of carbon nanotubes using a catalyst to crack a carbon source catalytically. In this reactor, the carbon source grows into carbon nanotubes on a catalyst support under the action of the catalyst at an appropriate temperature, for example, 500-1050° C., preferably 600-900° C., more preferably 650-800° C.

The fluidized bed reactor according to the present disclosure comprises a raw material gas inlet, a protective gas inlet and a catalyst feed port. The protective gas is fed from the protective gas inlet, and acts to fluidize the reaction material entering the fluidized bed reactor. Accordingly, the protective gas inlet is generally positioned near the raw material inlet. The catalyst feed port is positioned at the top of the fluidized bed reactor, and the raw material gas inlet and the protective gas inlet are positioned at the bottom of the fluidized bed reactor.

The fluidized bed reactor according to the present disclosure comprises an annular varying diameter zone, wherein the annular varying diameter zone is located between a position that is ¼ of the fluidized bed reactor from the bottom and the top of the fluidized bed reactor, and the pulse gas controller is disposed at a circular arc-shaped top of an annular varying diameter portion.

The number of the annular varying diameter portions in the annular varying diameter zone is 3-5, and the annular varying diameter zone is located from ¼ to ½ of the fluidized bed reactor from the bottom, wherein the varying diameter portion has a horizontal length of ⅛ to ⅕ of a diameter of the primary reactor, and the varying diameter portion has a curvature of 10°-30°.

The Coanda effect is a phenomenon in which a fluid deviates its original flow direction and attaches to a projecting cambered surface. According to the principle of this effect, if only an annular varying diameter zone is provided without providing a pulse gas, the Coanda effect will be insignificant; if only a pulse gas is provided without providing an annular varying diameter zone, the Coanda effect cannot be achieved. According to the present disclosure, the Coanda effect can be achieved by providing both an annular varying diameter zone and a pulse gas.

The pulse gas is a protective gas which is blown every 15 s for a period of time of 2 s per blow at a pulse rate of 15-20 m/s under the control of a pulse controller.

The pulse gas controller is used to apply a pulse gas to the annular varying diameter zone, wherein, along with variation of the gas in flow rate and direction at an annular varying diameter portion, carbon nanotubes having a catalyst content of greater than X are blown to the upper portion of the fluidized bed reactor to continue the cracking reaction, wherein X is any value in the range of 1.5%-3%, wherein the catalyst content is based on the weight of the carbon nanotubes that are formed.

In an embodiment of the present disclosure, a raw material gas intake pipe and a protective gas intake pipe can be disposed at the bottom of the fluidized bed reactor, wherein the raw material gas intake pipe is coupled to the reactor through the raw material gas inlet, and the protective gas intake pipe is coupled to the reactor through the protective gas inlet located near the raw material gas inlet.

In an embodiment of the invention, the protective gas inlet and the raw material gas inlet are arranged separately.

In another embodiment of the present disclosure, the protective gas inlet and the raw material gas inlet are combined into one inlet for feeding. When the protective gas inlet and the raw gas inlet are combined for feeding, only a raw gas intake pipe can be arranged, so that both a raw gas and a protective gas enter the primary reactor from the raw gas inlet through the raw gas intake pipe.

In another embodiment of the present disclosure, a mixed gas of the raw material gas and the protective gas is fed to the fluidized bed reactor.

In another embodiment of the present disclosure, a man hole is arranged at the top of the reaction apparatus to facilitate observation and maintenance.

In other embodiments of the present disclosure, the raw material gas inlet position and/or the protective gas inlet position can be arranged at a plurality of levels inside the primary reactor and/or at a plurality of points at the same level, thereby facilitating fluidized reaction and heat conduction.

(2) Separation Zone

In the present disclosure, the separation zone is in fluid communication with the top of the fluidized bed reactor, and a material recycle port is provided at the bottom of the separator.

In the present disclosure, "in fluid communication" means that a reaction material in a reaction apparatus is communicated with another reaction apparatus in a form of fluid in a fluidized state.

At a temperature of the fluidized bed reactor, a carbon source gas envelopes a magnetic catalyst and grows into carbon nanotubes on the catalyst. As a catalytic reaction proceeds to a higher extent, more carbon nanotubes grow on the catalyst, and the carbon nanotubes comprise a lower content of the magnetic catalyst. Such carbon nanotubes containing less catalyst are a desired product for industrial application. Conversely, at a lower extent of catalytic reaction, the carbon nanotubes thus obtained have a higher content of catalyst. Carbon nanotubes having a catalyst content of higher than 10% have a very narrow range of application, and need to be further recycled.

After the catalytic reaction, the reaction material in the fluidized bed reactor includes carbon nanotubes generated in the presence of the catalyst, unreacted carbon source gas and the magnetic catalyst. The completely reacted carbon nanotube particles settle down to the bottom of the reactor under gravity, while the incompletely reacted carbon nanotube particles having a higher ash content are fluidized under the action of the gas, and blown to the upper portion of the reactor by the gas stream. These particles may pass through the top of the reactor and enter the separation zone in a fluid form.

The materials entering the separation zone include the unreacted carbon source gas and the carbon nanotubes having a higher ash content, wherein the carbon nanotubes having a higher ash content settle down to the bottom of the separation zone under gravity. A material recycle port is provided at the bottom of the separation zone. The carbon nanotubes having a higher ash content enter the return pipe from the material recycle port, and are re-fed to the reactor.

(3) Return Pipe and Feedback Device Provided on the Return Pipe

In the present disclosure, the material recycle port of the separator is fluidly communicated with the bottom of the reactor via a return pipe. One end of the return pipe is fluidly coupled to the material recycle port in the separation zone, and the other end is fluidly coupled to the reactor. A feedback device is provided on the return pipe to feed the material in need of further reaction from the separation zone back to the reactor.

In a preferred embodiment of the present disclosure, the feedback device is a Venturi injector. The use of a Venturi injector can take advantage of the Venturi injection effect to deliver the separated carbon nanotubes having a high content of the magnetic catalyst back to the reactor.

In a preferred embodiment of the present disclosure, the Venturi injector is provided at the joint of the return pipe and the primary reactor.

In another preferred embodiment of the present disclosure, the Venturi injector is provided on the return pipe outside the primary reactor.

In another preferred embodiment of the present, the Venturi injector is provided inside the primary reactor.

In an example of the present disclosure, the Venturi injector comprises an injecting gas intake pipe, an injected gas intake pipe and a gas outlet, wherein the injecting gas intake pipe of the Venturi injector has a diameter of 15-200 mm; the injecting gas has a flow rate of 0.5-300 m/s; the injected gas intake pipe has a diameter of 15-200 mm; and the injected gas has a flow rate of 0.5-200 m/s.

(4) Dense Phase Material Transport Device

The dense phase material transport device is provided at the product outlet, connected between a discharge gas lock valve and a material storage tank. This device drains and transports the product based on the Coanda effect, and can realize transportation of a large amount of material by applying a small amount of gas. Its cost is low, and the maintenance is easy.

The dense phase material transport device is preferably a high temperature fan or a Coanda effect based air amplifier.

(5) Coanda Effect Based Gas Curtain

A gas curtain is provided on a cone wall of the fluidized bed reactor at the bottom. A protective gas enters from the lower portion, passes through an annular cavity, and is ejected at a high speed from an arc gap to reduce the contact of the carbon source gas with the reactor wall. The gas curtain provided on the wall of the reactor at the cone bottom is also based on the Coanda effect, wherein a high speed gas stream is used to generate a gas curtain over the reactor wall to remove carbon deposit and prevent agglomeration.

(6) Gas Lock Devices

A gas lock device may be employed on the reactor of the present disclosure to effect a pressurization operation.

The reaction apparatus of the present disclosure further comprises a feed gas lock device provided at the catalyst feed port, and a discharge gas lock device provided at the product outlet. The feed gas lock valve at the feed position and the discharge gas lock valve at the discharge position ensure that reaction can occur at high pressure in the reactor, so as to effectively increase the reaction temperature and the production capacity. The use of a pressurized fluidized bed is one of the effective means to achieve conversion from aggregative fluidization to disperse fluidization. Not only can the treatment volume be increased at higher pressure, but also the difference between the solid phase density and the gas phase density is reduced, favorable for improving fluidization quality.

In an embodiment of the present disclosure, the pressure in the fluidized bed reactor is from atmospheric pressure to 4 MPa, and the product outlet is controlled using a discharge gas lock valve. The reactor of the present disclosure is a single-stage reactor from which the reaction product is continuously discharged from the bottom.

(7) Metering Feed Device

The reaction apparatus of the present disclosure further comprises a catalyst metering feed device through which a catalyst is fed steadily quantitatively to the reactor. The catalyst feed device in the reaction apparatus is disposed on top of the fluidized bed reactor.

The inner wall of the fluidized bed reactor of the present disclosure may be sprayed periodically using a high temperature resistant composite material. The fluidized bed reactor of the present disclosure is further provided with an additional device for introducing a large amount of water vapor according to the process requirements to ablate the carbon deposit in the reactor.

Now specific embodiments of the present disclosure will be described in detail with reference to the accompanying drawings:

FIG. 1 is a schematic view showing a reaction apparatus used in a preferred embodiment of the present disclosure.

The reaction apparatus shown in FIG. 1 comprises a fluidized bed reactor 1, wherein a mixed gas intake pipe 2, a product metering discharge device 3, a discharge gas lock device 4 and an annular varying diameter zone 5 are provided at the bottom of the fluidized bed reactor 1; a catalyst metering feed device 6 and a feed gas lock device 7 are provided at the top of the fluidized bed reactor 1; a pulse gas controller 8 is provided at the circular arc-shaped top of the annular varying diameter zone; a gas curtain 9 is provided at the bottom of the fluidized bed reactor; and a tail gas outlet 10 is positioned at the upper side of the fluidized bed reactor 1.

When the reaction apparatus shown in FIG. 1 is used, a protective gas is introduced into the fluidized bed reactor 1 from the gas inlet through the mixed gas intake pipe 2 before the reaction. The temperature of the reactor is raised. A catalyst is fed through the catalyst metering feed device 6. A mixed gas of a raw material gas and a protective gas is introduced into the fluidized bed reactor 1 from the gas inlet through the mixed gas intake pipe 2. The pulse gas controller 8 in the annular varying diameter zone 5 is activated, wherein the pulse gas is a protective gas. Under the control of the pulse controller, the pulse gas is blown every 15 s for a period of time of 2 s per blow, and the pulse rate is 15-20 m/s. The gas curtain 9, the feed gas lock device 7 and the discharge gas lock device 4 are activated to carry out continuous production of carbon nanotubes.

Figure 2:
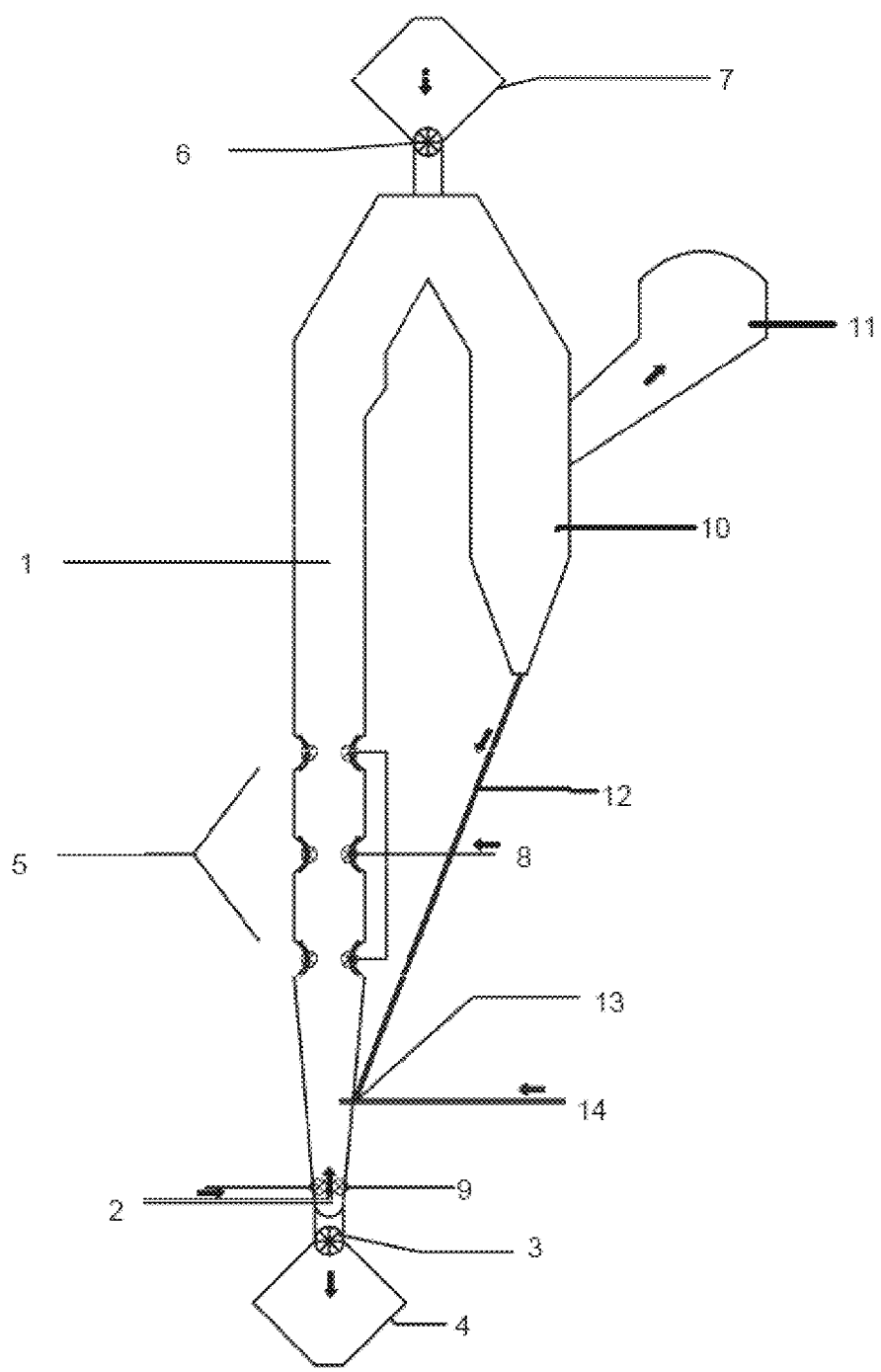
FIG. 2 is a schematic view showing another reaction apparatus for single-stage continuous preparation of carbon nanotubes according to the present disclosure, wherein the reaction apparatus comprises a separation zone.

FIG. 2 is a schematic view showing a reaction apparatus comprising a separation zone used in a preferred embodiment of the present disclosure.

The reaction apparatus shown in FIG. 2 comprises a fluidized bed reactor 1 and a separation zone 10 in communication with the top of the primary reactor, wherein a mixed gas intake pipe 2, a product metering discharge device 3, a discharge gas lock device 4 and an annular varying diameter zone 5 are provided at the bottom of the fluidized bed reactor 1; a catalyst metering feed device 6 and a feed gas lock device 7 are provided at the top of the fluidized bed reactor 1; a pulse gas controller 8 is provided at the circular arc-shaped top of the annular varying diameter zone; a gas curtain 9 is provided at the bottom of the fluidized bed reactor; and a tail gas outlet 11 is positioned at the upper side of the separation zone 10. A material recycle port and a return pipe 12 are provided at the bottom of the separation zone, wherein the separation zone 10 is coupled with the fluidized bed reactor through the return pipe 12. An injector 13 is provided on the return pipe 12. The injecting gas 14 is introduced into the fluidized bed reactor from an injecting gas inlet. The fluidized bed reactor has a diameter of 400 mm. The number of the annular varying diameter portions is 4, and the diameter is 80 mm. The pulse gas is a protective gas. Under the control of the pulse controller, the pulse gas is blown every 15 s for a period of time of 2 s per blow, and the pulse rate is 15-20 m/s.

When the reaction apparatus shown in FIG. 2 is used, a protective gas is introduced into the fluidized bed reactor 1 from the gas inlet through the mixed gas intake pipe 2 before the reaction. The temperature of the reactor is raised. A catalyst is fed through the catalyst metering feed device 6. A mixed gas of a raw material gas and a protective gas is introduced into the fluidized bed reactor 1 from the gas inlet through the mixed gas intake pipe 2. The pulse gas controller 8 in the annular varying diameter zone 5 is activated, and the gas curtain 9, the feed gas lock device 7 and the discharge gas lock device 4 are activated to carry out continuous production of carbon nanotubes. After reaction for a period of time, the incompletely reacted carbon nanotubes having a higher catalyst content accumulated at the bottom of the separation zone are introduced by the injector 13 into the fluidized bed reactor from the material recycle port through the return pipe, so as to continue the cracking reaction to form carbon nanotubes.

A method for continuous preparation of carbon nanotubes using the apparatus of the present disclosure comprises:

1) providing a carbon source and a catalyst in a fluidized state to a fluidized bed reactor, wherein the carbon source is cracked into carbon nanotubes under the action of the catalyst at a temperature of 500-1050° C.;

2) using a pulse gas controller to apply a pulse gas to an annular varying diameter zone, wherein, along with variation of the gas in flow rate and direction at an annular varying diameter portion, carbon nanotubes having a catalyst content of greater than X are blown to an upper portion of the fluidized bed reactor to continue the cracking reaction, wherein X is any value in the range of 1.5%-3%, wherein the catalyst content is based on a weight of the carbon nanotubes that are formed;

3) optionally, using a feedback device on a return pipe to deliver carbon nanotubes having a catalyst content of greater than X in a separation zone back to the primary reactor to continue the cracking reaction to form carbon nanotubes.

Now the method for continuous preparation of carbon nanotubes will be described:

(1) Providing a Carbon Source and a Catalyst in a Fluidized State, Wherein the Carbon Source is Cracked into Carbon Nanotubes Under the Action of the Catalyst In an embodiment of the present disclosure, the carbon source and the catalyst are dispersed in a fluidized protective gas to form a carbon source and a catalyst in a fluidized state.

In the present disclosure, the term "protective gas" means a gas that will not interfere with the reaction of the carbon source and the catalyst, non-limiting examples of which include, for example, nitrogen gas, helium gas, argon gas, etc.

In another embodiment of the present disclosure, the carbon source and the catalyst are mixed, followed by application of heat and a driving force to disperse the catalyst in a flowing vapor of the carbon source, so as to form a carbon source and a catalyst in a fluidized state.

In the above embodiment of the present disclosure, the driving force is used to provide the fluidized state, wherein the form of the driving force includes carrying by a carrier gas, rotation driving force or differential pressure driving force, and other driving forms. Carrying by a carrier gas involves carrying of a reactant by a protective gas such as nitrogen gas, argon gas and the like.

In an embodiment of the present disclosure, a protective gas (e.g. nitrogen gas) is used in a fluidized bed reactor to carry a carbon source and blow a catalyst into a suspension state, thereby providing a carbon source and a catalyst in a fluidized state.

In the present disclosure, the term "carbon nanotube" means a one-dimensional quantum material having a special structure, wherein it has a radial size on the order of nanometer scale, and an axial size on the order of micrometer scale. A carbon nanotube substantially consists of several to tens of layers of co-axial cylindrical tubes made of carbon atoms arranged hexagonally. A constant distance of about 0.34 nm is maintained between layers, and the diameter is generally 2-20 nm.

Reactions for preparation of carbon nanotubes from a carbon source in the presence of a catalyst are known in the art.

The carbon source suitable for the method of the present disclosure is not particularly limited, and may be a low carbon hydrocarbon containing 7 carbon atoms or less, or a heavy carbon source such as anthracene oil and waste tire oil, wherein the anthracene oil is a part of a coal tar composition and comprises anthracene, phenanthrene, acenaphthene and the like as main components; and the waste tire oil is a fuel oil manufactured by hydrolysis of waste tires, and comprises unsaturated hydrocarbons and benzene family compounds as the main components.

The catalyst suitable for the method of the present disclosure is a catalyst containing iron, cobalt, nickel or a transition metal commonly used in production of carbon nanotubes, for example, a $Fe_2O_3/Al_2O_3$ catalyst, among others. "Red mud" is a residue generated in production of aluminium oxide from bauxite. It's a red muddy waste, also named "red sludge". Red mud is rich in oxides of Fe, Al and Ca as well as small amounts of other components such as titanium oxides. These components happen to be active components for catalytic growth of carbon nanotubes. Hence, red mud can also be used as a catalyst for carbon nanotubes.

In an embodiment of the present disclosure, based on a total weight of the catalyst, the catalyst comprises iron, cobalt, nickel and the like in an amount of 1-50 wt %, preferably 2-40 wt %, more preferably 5-40 wt %.

In an example of the present disclosure, the carbon source is propylene, and the catalyst is a $Fe_2O_3/Al_2O_3$ catalyst which has an iron content of 38 wt % based on a total weight of the catalyst.

In another example of the present disclosure, the carbon source is waste tire oil, and the catalyst is a $Fe_2O_3/Al_2O_3$ catalyst which has an iron content of 38 wt % based on a total weight of the catalyst.

In another example of the present disclosure, the carbon source is anthracene oil, and the catalyst is red mud which has an iron content of 36.69% based on a total weight of the catalyst.

In an example of the present disclosure, the carbon source is cracked into carbon nanotubes in the presence of a catalyst at a temperature of 500-1000° C., preferably 600-900° C., more preferably 650-800° C.

Methods for providing a carbon source and a catalyst for the present disclosure are not particularly limited, and they can be any conventional methods known in the art.

2) Sieving Incompletely Reacted Carbon Nanotubes by Applying a Pulse Gas to Introduce the Coanda Effect At a temperature of the fluidized bed reactor, a carbon source gas envelopes a catalyst and grows into carbon nanotubes on the catalyst. As a catalytic reaction proceeds to a higher extent, more carbon nanotubes grow on the catalyst, and the carbon nanotubes comprise a lower content of the catalyst. Such carbon nanotubes containing less catalyst are a desired product for industrial application. Conversely, at a lower extent of catalytic reaction, the carbon nanotubes thus obtained have a higher content of catalyst, and need to be further recycled.

When a pulse gas stream is introduced at the top of an annular varying diameter portion in the annular varying diameter zone, there is generated the Coanda effect which changes the flow rate and flow direction of the gas, leading to a "tumbling" effect and thus sieving of the carbon nanotube particles, wherein the completely reacted carbon nanotube particles settle down to the bottom of the reactor under gravity, while the incompletely reacted particles having a higher ash content are blown to the upper portion of the reactor, wherein the carbon nanotubes having a catalyst content of greater than X are blown to the upper portion of the fluidized bed reactor to continue the cracking reaction, wherein X is any value in the range of 1.5%-3%, wherein the catalyst content is based on a weight of the carbon nanotubes that are formed.

(3) Feeding the Carbon Nanotubes Having a Catalyst Content of Greater than X in the Separation Zone Back to the Primary Reactor Through a Feedback Device on a Return Pipe Part of the incompletely reacted carbon nanotube particles, in a fluidized state under the action of the gas, are blown into the upper portion of the reactor by the gas stream, and pass through the top of the reactor to enter the separation zone in a fluid form. The materials entering the separation zone include unreacted carbon source gas and carbon nanotubes having a higher ash content, wherein the carbon nanotubes having a higher ash content settle down to the bottom of the separation zone under gravity, and are refed to the primary reactor by a feedback device on a return pipe to participate in the reaction.

In the present disclosure, feedback of a material can be fulfilled by Venturi injection. The Venturi injection principle means that, when a fluid flows at a high speed, it drags a fluid surrounding it to flow together due to its faster speed compared with the surrounding fluid, and a pressure variation surrounding the high speed fluid produces a draining effect for the surrounding fluid.

According to the present disclosure, the feedback of the material can also be fulfilled by a high temperature fan, a high temperature compressor or the like provided on the return pipe, which delivers carbon nanotubes having a high magnetic catalyst content and unreacted gas in the separator to the fluidized bed reactor again to participate in the reaction.

In another embodiment of the present disclosure, a carrier gas entering through a protective gas inlet has a flow rate of 0.5-300 m/s, preferably 5.0-200 m/s, more preferably 10-100 m/s; and a gas entering through a raw material gas inlet has a flow rate of 0.2-300 m/s, preferably 1.0-200 m/s, more preferably 10-100 m/s.

In a preferred embodiment of the present disclosure, the method for continuous preparation of carbon nanotubes using the reaction apparatus of the present disclosure comprises the following specific steps:

1) heating a primary reactor to 600-1000° C. by introducing $N_2$ 20-60 min into the primary reactor through a protective gas intake pipe;

2) charging a catalyst from a catalyst metering feed device;

3) gasifying a carbon source under the protection of nitrogen gas at 300-1000° C., and delivering a mixture of the gasified carbon source and nitrogen gas to the primary reactor through a raw material gas intake pipe to blow the catalyst into a state of fluidized suspension, wherein the gas and solid phases are in full contact, and the carbon source gas adheres to the catalyst surface and cracks gradually to form carbon nanotubes;

4) activating a pulse gas controller after reaction for a period of time when more and more carbon nanotubes are formed and the volume of the solid material expands continuously, so as to introduce the Coanda effect in the annular varying diameter zone of the fluidized bed reactor, wherein solid particles in the material naturally settle down under the action of gravity and the entraining force of the flowing gas, wherein the completely reacted carbon nanotube particles settle down to the bottom of the reactor under gravity, while the incompletely reacted particles having a higher ash content are blown to the upper portion of the reactor by the gas stream to continue the cracking reaction;

5) repeating steps 2, 3, 4 for continuous production of carbon nanotubes.

In a preferred example of the present disclosure, the method for continuous preparation of carbon nanotubes using the reaction apparatus of the present disclosure comprises the following specific steps:

1) heating a primary reactor to 600-1000° C. by introducing $N_2$ 20-60 min into the primary reactor through a protective gas intake pipe, at which temperature a catalyst is charged from a catalyst metering feed device;

2) gasifying a carbon source under the protection of nitrogen gas at 300-1000° C., and delivering a mixture of the gasified carbon source and the nitrogen gas to the primary reactor through a raw gas intake pipe to blow the catalyst into a state of fluidized suspension, wherein the gas and solid phases are in full contact, and the carbon source gas adheres to the catalyst surface and cracks gradually to form carbon nanotubes;

3) activating a pulse gas controller after reaction for a period of time when more and more carbon nanotubes are formed and the volume of the solid material expands continuously, so as to introduce the Coanda effect in the annular varying diameter zone of the fluidized bed reactor, wherein the pulse gas is nitrogen gas which is blown every 15 s for a period of time of 2 s per blow at a pulse rate of 15-20 m/s under the control of the pulse controller, wherein solid particles in the material naturally settle down under the action of gravity and the entraining force of the flowing gas, wherein the completely reacted carbon nanotube particles settle down to the bottom of the reactor under gravity, while the incompletely reacted particles having a higher ash content are blown to the upper portion of the reactor by the gas stream to continue the cracking reaction;

4) introducing the incompletely reacted carbon nanotube particles blown to the upper portion of the reactor into a separation zone under the action of the gas stream, wherein the particles gradually settle down to the bottom of the separation zone under gravity, and are refed to the fluidized bed reactor by a feedback device on a return pipe to participate in the reaction.

In a preferred example of the present disclosure, nitrogen is introduced through the protective gas intake pipe at a flow rate of 0.5-300 m/s, preferably 5.0-200 m/s, more preferably 10-100 m/s; the mixed gas entering the fluidized bed reactor has a volume ratio of nitrogen:carbon source gas=1:1-1:2; the mixed gas is introduced through the raw material gas inlet at a flow rate of 0.2-300 m/s, preferably 1.0-200 m/s, more preferably 10-100 m/s; the reaction time is 30 min-1.5 h; the gas flow rate within the fluidized bed is 0.01-10 m/s, preferably 0.05-5 m/s, more preferably 0.1-3 m/s; the pulse gas is nitrogen or the like; and the pulse gas is blown every 15 s for a period of time of 2 s per blow at a pulse rate of 15-20 m/s under the control of the pulse controller.

The beneficial effects of the invention include:

(1) Several annular varying diameter portions in the middle of the reactor contribute to the fluidization of the reaction system and the sieving of unreacted carbon nanotube particles, and promote the utilization rate of the carbon source by increasing the reaction time of the carbon nanotube particles;

(2) The Coanda effect based gas curtain provided on both sides of the cone bottom of the primary reactor can effectively clean the carbon deposit on the reactor wall, prevent agglomeration and facilitate discharge of the materials;

(3) High pressure cracking reaction can be accomplished by controlling the discharge gas lock valve at the bottom of the reactor. Under the limitation of the heat transfer factor of the reactor, high pressure is utilized to increase the reaction temperature, promote the production capacity, and save energy;

(4) The material transport device based on the Coanda effect realizes transport of a large amount of powder material with the supply of a small amount of protective gas;

(5) The apparatus has a simple structure, and requires a low maintenance cost; the method can be performed easily at high efficiency and low energy consumption, suitable for large-scale industrial production.

The present disclosure will be further illustrated with reference to the following specific Examples. It's to be understood that these Examples are only intended to demonstrate the present disclosure without limiting the scope of the present disclosure. The experimental methods in the following examples for which no specific conditions are indicated will be carried out generally under conventional conditions or under those conditions suggested by the manufacturers. Unless stated otherwise particularly, ratios and percentages are based on moles.

Raw material sources and preparation:

(1) Carbon sources

Propylene: available from Chambroad Petrochemical, Shandong, purity: >99.5%;

Propane: available from Longhua Gases, Qingdao, purity: >95%;

Ethylene: available from Shandong Qilu Petrochemical Company, purity: >99.9%.

(2) Catalyst:

Iron based catalyst: obtained by mixing and co-precipitation of 40.4 g ferric nitrate nonahydrate, 41.25 g aluminum nitrate nonahydrate and 97 g ammonium carbonate, followed by drying at 105° C., and calcination at 600° C., wherein the iron content was 29.12%;

Nickel based catalyst: obtained by mixing and co-precipitation of 4.1 g nickel nitrate hexahydrate, 52.5 g magnesium nitrate hexahydrate, 20.2 g ferric nitrate nonahydrate and 124 g ammonium carbonate, followed by drying at 110° C., and calcination at 650° C., wherein the iron content was 31%, and the nickel content was 9.15%;

Cobalt based catalyst: obtained by mixing and co-precipitation of 29.1 g cobalt nitrate hexahydrate, 55.6 g magnesium nitrate hexahydrate and 87 g ammonium carbonate, followed by drying at 100° C., and calcination at 680° C., wherein the cobalt content was 36.39%.

Tests for Product Properties:

(1) Ash Test:

Ash in the carbon nanotubes was determined according to National Standard GB/T 3780.10-2009. The main component of the ash was the magnetic catalyst which was unable to burn in the tests. Determination of ash may be used to determine the content of the carbon phase in a product, and thus characterize the purity of the carbon nanotubes indirectly.

(2) Specific Surface Area Test:

The specific surface areas of the products were determined with a N2 physical adsorption analyzer according to National Standard GB/T 10722.

(3) Micromorphology Test:

The outer diameters and lengths of the carbon nanotubes were determined by Scanning Electron Microscopy (SEM) and Transmission Electron Microscopy (TEM).

Example 1

This Example was based on the reaction apparatus shown in FIG. 1, wherein the carbon source was propylene, and the catalyst was an iron based catalyst having a total iron content of 29.12%.

Figure 3:
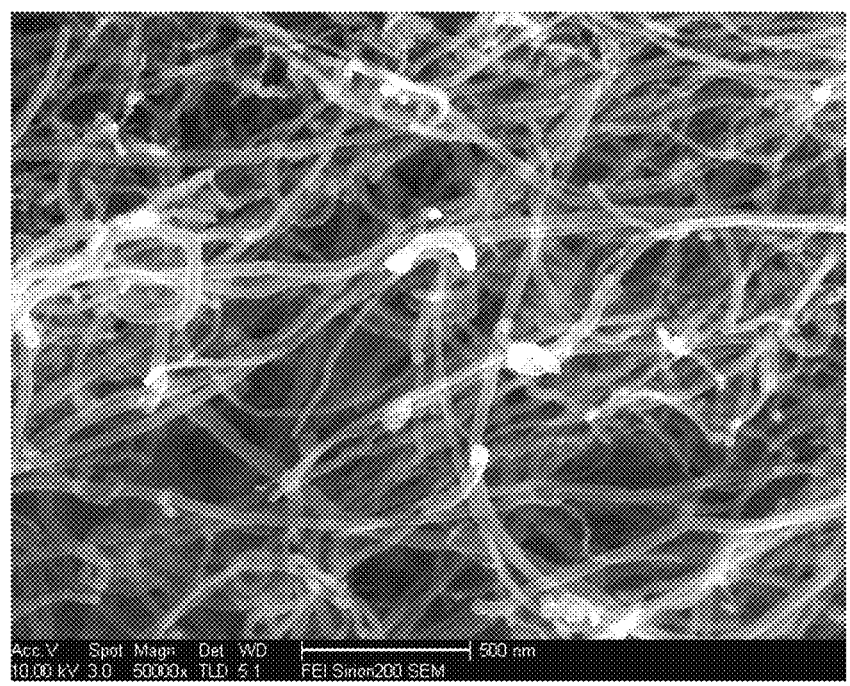
FIG. 3 is an SEM image of the carbon nanotubes prepared in Example 1 according to the present disclosure.

Prior to reaction, nitrogen gas was introduced through the mixed gas inlet at a $N_2$ flow rate of 8.0 m/s for 20 min, and the primary reactor was heated to 650° C. under the protection of nitrogen. Steady, continuous feeding at 60 g/h was started at the catalyst feed port, and a mixed gas of propylene: nitrogen of 1:2 was introduced into the reactor from the mixed gas inlet at a gas flow rate of 1.2 m/s to generate a fluidized state. Pulse blowing was started at the annular varying diameter portions of the primary reactor and the gas curtain at the bottom. The discharge gas lock valve was opened. The production continued for 3 h with 9.25 kg carbon nanotubes produced. The SEM image of the carbon nanotubes is shown in FIG. 3.

The carbon nanotube product thus obtained had the following parameters and properties:ash<2.5%, outer diameter 12-20 nm, length 5-12 μm, specific surface area>260 $m^2$/g, black, bulk density 0.18 g/$cm^3$. As verified by the test results, the catalyst content in the carbon nanotubes collected from the product outlet was less than 2.5%.

The above steps were performed uninterruptedly for continuous production of multi-walled carbon nanotubes.

Example 2

This Example was based on the reaction apparatus shown in FIG. 1, wherein the carbon source was propane, and the catalyst was a nickel based catalyst having a total nickel content of 9.15% and an iron content of 31%.

Figure 4:
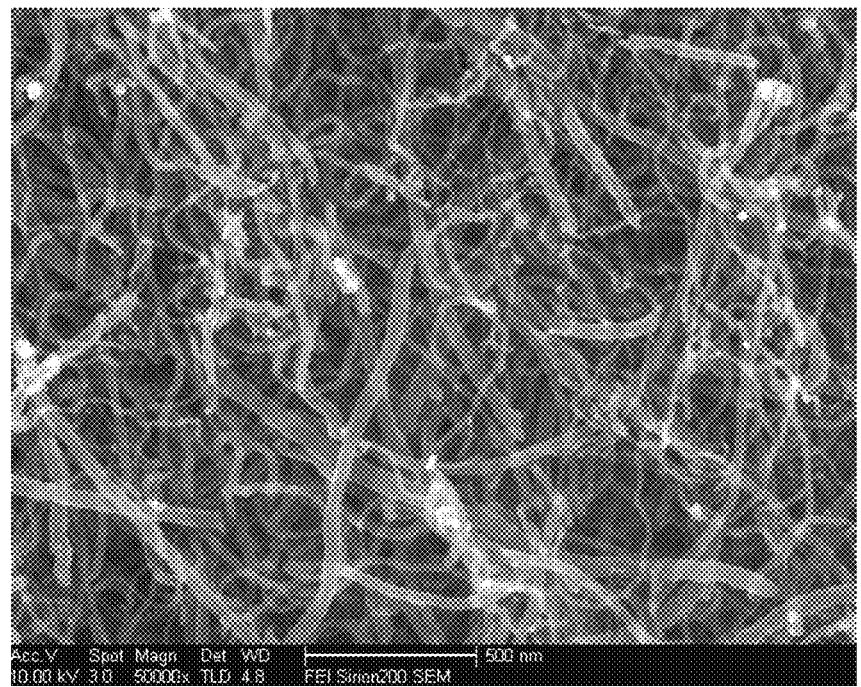
FIG. 4 is an SEM image of the carbon nanotubes prepared in Example 2 according to the present disclosure.

Prior to reaction, nitrogen gas was introduced through the mixed gas inlet at a $N_2$ flow rate of 8.0 m/s for 30 min, and the primary reactor was heated to 730° C. under the protection of nitrogen. Steady, continuous feeding at 30 g/h was started at the catalyst feed port, and a mixed gas of propane: nitrogen of 1:2.5 was introduced into the reactor from the mixed gas inlet at a gas flow rate of 0.9 m/s to generate a fluidized state. Pulse blowing was started at the annular varying diameter portions of the primary reactor and the gas curtain at the bottom. The discharge gas lock valve was opened. The production continued for 2 h with 3.51 kg carbon nanotubes produced. The SEM image of the carbon nanotubes is shown in FIG. 4.

The carbon nanotube product thus obtained had the following parameters and properties:ash<2.0%, outer diameter 15-30 nm, length 5-15 μm, specific surface area>210 $m^2$/g, black, bulk density 0.22 g/$cm^3$. The test results verified that the catalyst content in the carbon nanotubes collected from the product outlet was less than 2.0%.

The above steps were performed uninterruptedly for continuous production of multi-walled carbon nanotubes.

Example 3

This Example was based on the reaction apparatus shown in FIG. 1, wherein the carbon source was ethylene, and a cobalt based catalyst having a total cobalt content of 36.39% was used.

Figure 5:
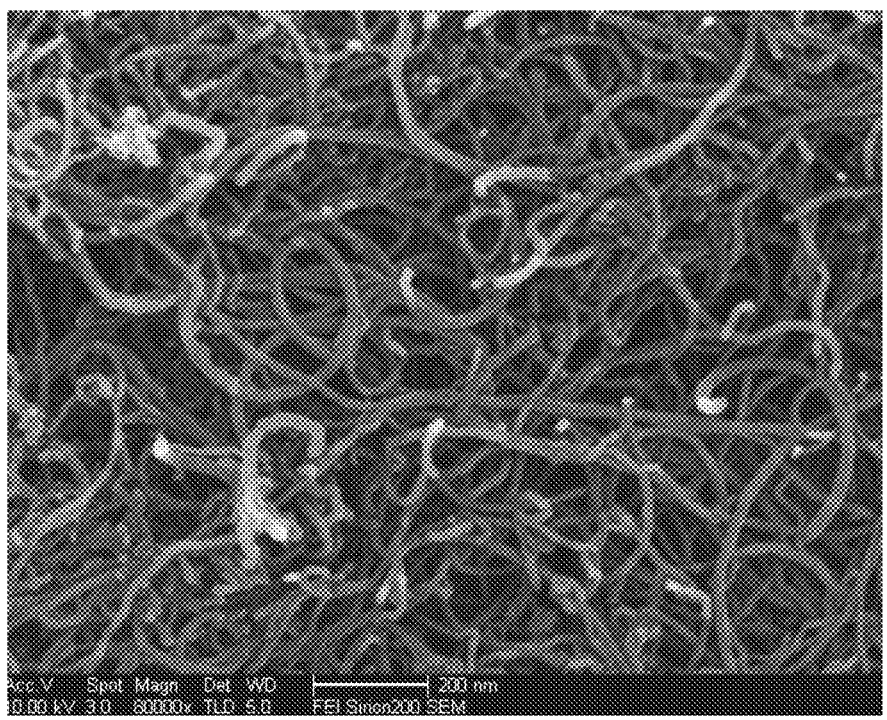
FIG. 5 is an SEM image of the carbon nanotubes prepared in Example 3 according to the present disclosure.

Prior to reaction, nitrogen gas was introduced through the mixed gas inlet at a $N_2$ flow rate of 8.0 m/s for 60 min, and the primary reactor was heated to 690° C. under the protection of nitrogen. Steady, continuous feeding at 50 g/h was started at the catalyst feed port, and a mixed gas of ethylene: nitrogen of 1:3 was introduced into the reactor from the mixed gas inlet at a gas flow rate of 0.8 m/s to generate a fluidized state. Pulse blowing was started at the annular varying diameter portions of the primary reactor and the gas curtain at the bottom. The discharge gas lock valve was opened. The production continued for 3 h with 4.57 kg carbon nanotubes produced. The SEM image of the carbon nanotubes is shown in FIG. 5.

The carbon nanotube product thus obtained had the following parameters and properties:ash<5%, outer diameter 20-30 nm, length 5-20 μm, specific surface area>170 $m^2$/g, black, bulk density 0.17 g/$cm^3$. The test results verified that the catalyst content in the carbon nanotubes collected from the product outlet was less than 5%.

The above steps were performed uninterruptedly for continuous production of multi-walled carbon nanotubes.

For the process method for continuous preparation of carbon nanotubes according to the present disclosure, the amounts and proportions of the raw materials and the process parameters are not limited by the Examples provided above. Various changes or modifications to the present disclosure can be made by those skilled in the art after reading the above teachings of the present disclosure, and these equivalent variations fall in the scope defined by the accompanying claims of the application as well.

What is claimed is:

1. An apparatus for continuous preparation of carbon nanotubes, comprising:
   a fluidized bed reactor having an annular varying diameter zone, a raw material gas inlet, a catalyst feed port, a protective gas inlet, and a pulse gas controller, where the annular varying diameter zone is located between a position that is ¼ of the fluidized bed reactor from the bottom and the top of the fluidized bed reactor;
   the pulse gas controller is disposed at a circular arc-shaped top of a varying diameter portion in the annular varying diameter zone;
   the catalyst feed port is located at a top of the fluidized bed reactor;
   the raw material gas inlet and the protective gas inlet are located at a bottom of the fluidized bed reactor; and
   where the apparatus further comprises a product outlet and a tail gas outlet.

2. The apparatus of claim 1, wherein the apparatus further comprises:
   a separation zone in fluid communication with the fluidized bed reactor;
   a return pipe; and
   a feedback device disposed on the return pipe, where a material recycle port is provided at a bottom of the separation zone, one end of the return pipe is fluidly coupled to the material recycle port in the separation zone, and the other end is fluidly coupled to the bottom of the fluid reactor.

3. The apparatus of claim 1, wherein the number of the annular varying diameter portions in the annular varying diameter zone is 3-5, and the annular varying diameter zone is located from ¼ to ½ of the fluidized bed reactor from the bottom, where the varying diameter portion has a horizontal length of ⅛ to ⅕ of a diameter of the primary reactor, and the varying diameter portion has a curvature of 10°-30°.

4. The apparatus of claim 1, wherein the apparatus further comprises a dense phase material transport device disposed at the product outlet.

5. The apparatus of claim 1, wherein the apparatus further comprises a Coanda effect based gas curtain disposed at the bottom of the fluidized bed reactor.

6. The apparatus of claim 1, wherein the apparatus further comprises a metering feed device and a feed gas lock device disposed at the catalyst feed port, and a discharge gas lock device disposed at the product outlet.

7. The apparatus of claim 1, wherein at least one of the group consisting of the raw material gas inlet and the protective gas inlet are arranged at least one of the group consisting of a plurality of levels inside the fluidized bed reactor and at a plurality of points at the same level.

8. The apparatus of claim 1, wherein the protective gas inlet and the raw material gas inlet are arranged separately or combined for feeding.

9. A method for continuous preparation of carbon nanotubes using the apparatus of claim 1, comprising:
   1) providing a carbon source and a catalyst in a fluidized state to a fluidized bed reactor, where the carbon source is cracked into carbon nanotubes under the action of the catalyst at a temperature of 500-1050° C.;
   2) using a pulse gas controller to apply a pulse gas to an annular varying diameter zone, where, along with variation of the gas in flow rate and direction at an annular varying diameter portion, carbon nanotubes having a catalyst content of greater than X are blown to an upper portion of the fluidized bed reactor to continue the cracking reaction, where X is any value in the range of 1.5%-3%, where the catalyst content is based on a weight of the carbon nanotubes that are formed; and
   3) optionally, using a feedback device on a return pipe to deliver carbon nanotubes having a catalyst content of greater than X in a separation zone back to the primary reactor to continue the cracking reaction to form carbon nanotubes.

10. The method of claim 9, wherein a carrier gas entering through the protective gas inlet has a flow rate of 0.5-300 m/s; a gas entering through the raw material gas inlet of the fluidized bed reactor has a flow rate of 0.2-300 m/s; a gas flow rate within the fluidized bed is 0.01-10 m/s; a mixed gas entering through the gas inlet has a gas flow rate of 0.1 m/s-2 m/s; and a pressure in the fluidized bed reactor is from atmospheric pressure to 4 MPa.

* * * * *